United States Patent
Braun et al.

(10) Patent No.: US 9,483,583 B2
(45) Date of Patent: Nov. 1, 2016

(54) SYSLOG PARSER

(75) Inventors: Uri Braun, Ramat Hasharon (IL); Yuri Zaslavsky, Rishon Le Zion (IL); Yosef Teitz, Hashmonaim (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 1794 days.

(21) Appl. No.: 11/875,955

(22) Filed: Oct. 22, 2007

(65) Prior Publication Data

US 2009/0119307 A1    May 7, 2009

(51) Int. Cl.
*G06F 17/30* (2006.01)

(52) U.S. Cl.
CPC ... *G06F 17/30985* (2013.01); *G06F 17/30144* (2013.01); *G06F 17/30964* (2013.01)

(58) Field of Classification Search
CPC ............... G06F 17/30144; G06F 17/30185; G06F 17/30985
See application file for complete search history.

(56) References Cited

U.S. PATENT DOCUMENTS

| | | | | |
|---|---|---|---|---|
| 2005/0022207 | A1* | 1/2005 | Grabarnik et al. | 719/313 |
| 2005/0102276 | A1* | 5/2005 | Dinh et al. | 707/3 |
| 2007/0283194 | A1* | 12/2007 | Villella et al. | 714/57 |

OTHER PUBLICATIONS

Lonvick, "The BSD Syslog Protocol", Aug. 2001, Network Working Group, pp. 1-28.*

* cited by examiner

*Primary Examiner* — Rehana Perveen
*Assistant Examiner* — Huen Wong
(74) *Attorney, Agent, or Firm* — Mark M. Friedman

(57) ABSTRACT

A computerized method performed in a computer operatively connected to storage. Parsing rules are determined for parsing logs output as text and/or symbols from multiple devices in a computer network. The logs are stored in the storage. Multiple log samples are sampled from the logs. The log samples are input into an application running on the computer. The log samples are each sectioned into multiple sections which include variable information separated by static structural text. Each of the log samples is processed by: comparing the sections to a list of regular expressions. The list is maintained in the storage, and upon matching a matched section of the sections to a matched regular expression from the list of the regular expressions, the matched section is tagged with a tag associated with the matched regular expression. The tag associated to the matched regular expression is stored and combined with any unmatched sections and with the static structural text to create a log pattern. The log pattern is stored in a table only if the log pattern is distinct from all log patterns previously stored in the table.

9 Claims, 10 Drawing Sheets

```
<173>logger: Mar 21 20:42:48 sensor1 38239: Jan 21 20:39:13: %IPS-1: list SNMP_USERVARS denied udp
    194.29.40.12(36541) -> 62.90.2.1(161), 0 packets(+)

<173>logger: Mar 21 20:42:48 sensor1 382310: Jan 21 20:39:17: %IPS-1: list hostscan permitted icmp
    192.168.50.103 -> 0.0.0.0 (8/0), 0 packets(+)

<173>logger: Mar 21 20:42:48 sensor1 382315: Jan 21 20:39:19: %IPS-1: list traceroute permitted tcp
    164.61.193.68(0) -> 10.51.71.243(18192), 0 packets(+)
```

*Fig. 1*
*Prior Art*

```
.....Log Pattern 1......
<173>logger Mar 21 20:42:48 sensor1 38235: Jan 21 20:39:11: %IPS-1: list SNMP_USERVARS denied udp 192.168.35.89(41919) -> 194.29.40.36(161), 0 pa
                                                                                                    ⎫_____⎪_____⎭
                                                                                                    103H
                                                                                                    Highlighted
                                                                                                    Section
      ↑
      101H
      Highlighted
      log sample
```

Fig. 3

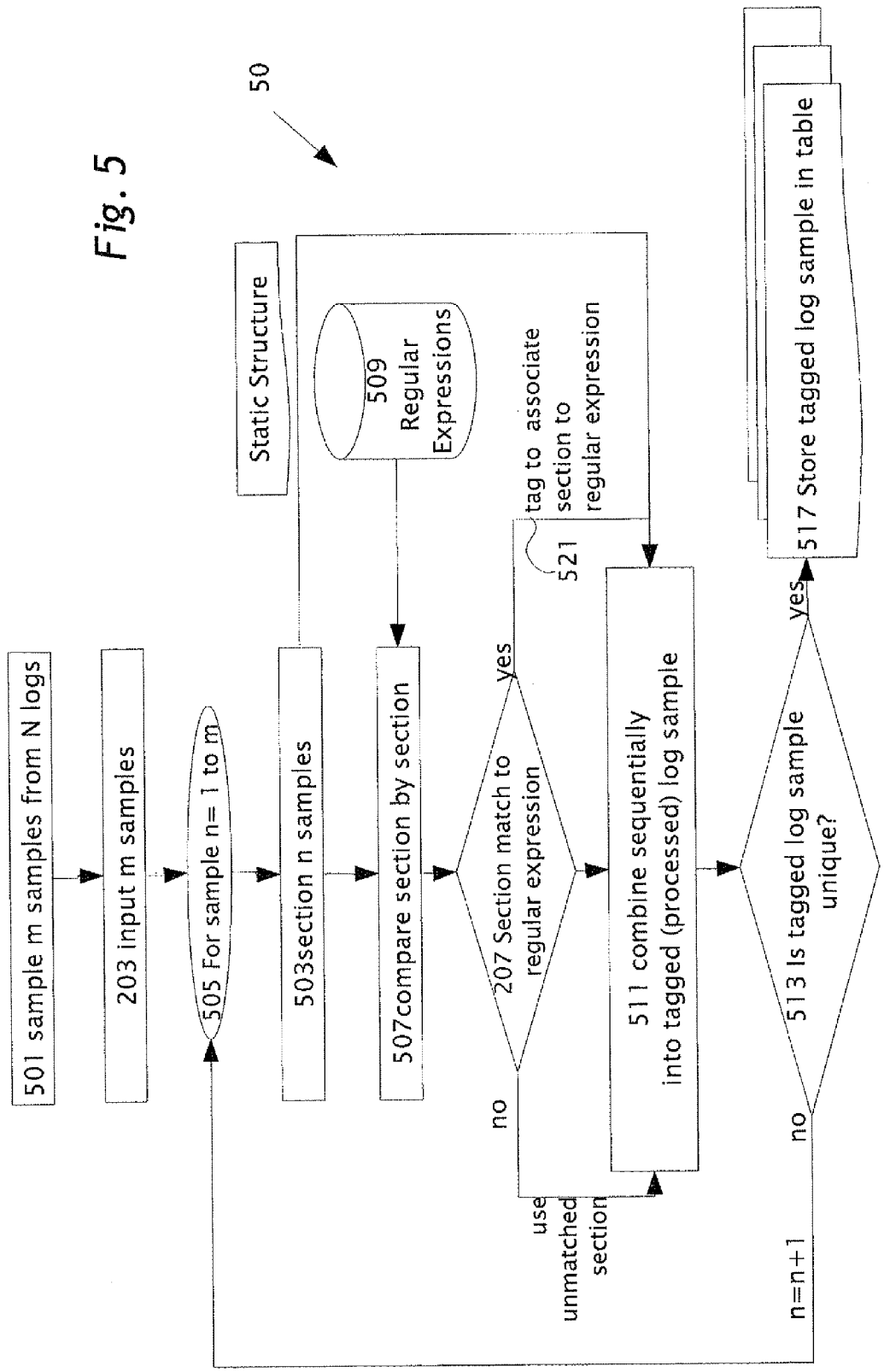

SYSLOG PARSER

CROSS REFERENCE TO RELATED APPLICATIONS

N/A

FIELD AND BACKGROUND OF THE INVENTION

The present invention relates to management and maintenance of a computer network and, more particularly, to a method for processing information as logged from disparate devices attached to the network. Specifically, the method includes determining parsing rules for a large number of logs by reducing a set of log samples to a small set of unique patterns of the log samples.

Modern computer networks have a multi-layered security architecture including many security devices which ensure that servers, hosts, and applications running on the network are protected from harmful activity. The devices all generate voluminous logs that are difficult and time consuming to interpret. In order to have practical value from the logs, enterprises need to manage the deluge of data logged by these devices. Tracking network and security activity trends over time by manually scanning log files is difficult and time consuming.

Check Point Eventia Suite™ provides a security information and event management solution for enterprises looking to efficiently manage large volumes of data logged from disparate sources. Eventia Suite™ automates and centralizes security log data analysis and provides previously defined or custom reports.

Syslog is a standard for forwarding log messages in an IP network. The term "syslog" is often used for both the actual syslog protocol, as well as the application or library sending syslog messages.

The syslog protocol is a client-server type protocol: the syslog sender sends a small textual message (less than 1024 bytes) to the syslog receiver. The receiver is commonly called "syslogd", "syslog daemon" or "syslog server". Syslog messages can be sent via UDP and/or TCP. Syslog is typically used for computer system management and security auditing. Syslog is supported by a wide variety of devices and receivers across multiple platforms. Because of this, syslog can be used to integrate log data from many different types of systems into a central repository. {from http://en.wikipedia.org/wiki/Syslog}

In computing, a regular expression is a string that is used to describe or match text, according to certain syntax rules. The term "regular expression" as used herein is a string that is used to describe or match the alphanumeric and/or symbolic text of the log according to certain syntax rules. As an example, the string [0-9]+ is a regular expression representing one or more digits. Regular expressions are used by many text editors, utilities, and programming languages to search and manipulate text based on text patterns. As an example of regular expression syntax, the regular expression \bex can be used to search for all instances of the string "ex" that occur at word boundaries (signified by the \b). Thus in the string, "Texts for experts," \bex matches the "ex" in "experts," but not in "Texts" because the "ex" occurs inside the word there and not immediately after a word boundary. {from http://en.wikipedia.org/wiki/Regular_expressions}

In the prior art, syslogs parsing rules require highly specialized knowledge of the parsing rules and regular expressions—formulas that describe patterns in the syslog data. For example, a date has a regular expression as follows:

{Jan,Feb,Mar,Apr,May,Jun,Jul,Aug,Sep,Oct,Nov, Dec} [0-3][0-9], [0-9][0-9][0-9][0-9]

In the prior art, Eventia Analyzer™ is manually configured to read outputs from third party products as data in the form of Syslogs, SNMP traps, Windows Events, World Wide Web Consortium (WWWC) and Netflows. In the prior art, the most common input of Eventia Analyzer™ is in the form of regular expressions composed by the system administrator, integrator, or other value provider to match logs of the third party product. The data from the syslogs are then parsed using the regular expressions and the data is put into data fields of a Check Point log which may be viewed using a Check Point product SmartView Tracker™.

There is thus a need for, and it would be highly advantageous to have a method for determining parsing rules for a large number of logs by reducing a set of log samples to a small set of unique patterns of the log samples, a method which does not require the system administrator to understand all the logs output from all the devices of the network and to compose regular expression which match all the logs.

US patent application publication 20070198565 discloses a user interface (UI) by which a user can design a regular expression. The graphical interactive mechanism enables the user to develop regular expressions without an understanding of the intricacies of the regular expression syntax. The UI can provide an interactive mechanism by which a user can graphically annotate (e.g., color, highlight) a regular expression thus, mapping the expression to a particular tabulated output. The UI can provide a particular kind of dialog layout with several controls and dynamically linked views, e.g., a data view, a regular expression view and a column view which can facilitate definition of the regular expression as well as creation of mappings to output columns (e.g., annotations). U.S. patent application publication 20070198565 is included herein by reference for all purposes as if entirely set forth herein.

SUMMARY OF THE INVENTION

Terminology

The term "log" as used herein is a text string, e.g. alphanumeric and/or other symbols output from a device connected to a computer network. The term "regular expression" as used herein is a string including text symbols and/or alphanumeric characters that is used to describe or match a log or portion thereof according to certain syntax rules. The term "log sample" refers to a number of logs sampled from a typically larger number of logs output from devices in the computer network. FIG. 1 of the prior art illustrates three log samples 101. Reference is also made to FIG. 1A which illustrates different parts of log sample 101, according to embodiments of the present invention.

The term "section", as used herein is a variable portion, e.g. source IP address 164.61.193.68, of a log, the section associated with and matches a regular expression, e.g. [0-9]+\.[0-9]+\.[0-9]+\.[0-9]+ or other variable name, e.g. "permitted".

The term "log pattern" or "pattern" as used herein is a log sample with one or more sections processed by either matching one or more sections to a regular expression and/or by associating the section with field information.

According to the present invention there is provided a computerized method performed in a computer operatively connected to storage. Parsing rules are determined for parsing logs output as text from multiple devices in a computer network. The logs are stored in the storage. Multiple log samples are sampled from the logs. The log samples are input into an application running on the computer. The log samples are each sectioned into multiple sections which include variable information separated by static structural text. Each of the log samples is processed by: (i) comparing the sections to a list of regular expressions. The list is maintained in the storage, and (ii) upon matching a matched section of the sections to a matched regular expression from the list of the regular expressions, the matched section is tagged with a tag associated with the matched regular expression. The tag associated to the matched regular expression is stored and (v) combined with any unmatched sections and with the static structural text to create a log pattern. The log pattern is stored in a table only if the log pattern is distinct from all log patterns previously stored in the table. A user interface is preferably provided to a user of the computer. A portion of a log pattern is presented to the user on a display operatively connected to the computer. The user edits the portion thereby producing at least one edited log pattern. Subsequent to the editing, the application checks if the edited log pattern is identical with another log pattern in the table and upon finding another identical log pattern, either the edited log pattern or the previously stored other log pattern is removed from the table. A sub-pattern is preferably extracted from the log pattern, the sub-pattern matching the beginning of the log pattern up to and including the portion prior to the editing. All other log patterns are searched for the sub-pattern including an equivalent portion to the portion prior to the editing. Upon finding an equivalent sub-pattern in the other log pattern, the other log pattern is edited at the equivalent portion. The editing preferably includes either: inserting a new section in the other log pattern or modifying an existing section in the other log pattern. Preferably, the user is not previously queried before editing the other log pattern.

According to the present invention there is provided a computerized method performed in a computer operatively connected to storage. Parsing rules are determined for parsing logs output as text from multiple devices in a computer network. The logs are stored in the storage. Multiple log samples are sampled from the logs. The log samples are input into an application running on the computer. Each of the log samples is compared to a list of regular expressions. The list is maintained in the storage and upon matching each log sample to at least one matched regular expression from the list, the at least one matched regular expression is associated to the log sample thereby creating a log pattern. The log pattern is stored in a table only if the log pattern is distinct from all log patterns previously stored in the table. A user interface is preferably provided to a user of the computer. A portion of a log pattern is presented to the user on a display operatively connected to the computer. The user edits the portion thereby producing at least one edited log pattern. Subsequent to the editing, the application checks if the edited log pattern is identical with another log pattern in the table and upon finding another identical log pattern, either the edited log pattern or the previously stored other log pattern is removed from the table. A sub-pattern is preferably extracted from the log pattern, the sub-pattern matching the beginning of the log pattern up to and including portion prior to the editing. All other log patterns are searched for the sub-pattern including an equivalent portion to the portion prior to the editing. Upon finding an equivalent sub-pattern in the other log pattern, the other log pattern is edited equilvalently at the equivalent portion. The editing preferably includes either: inserting a new section in the other log pattern or modifying an existing section in the other log pattern. Preferably, the editing is performed for all equivalent sub-patterns without previously querying the user.

According to the present invention, there is provided a computer readable medium readable by a machine, tangibly embodying a program of instructions executable by the machine to perform methods for determining parsing rules for parsing logs output from multiple devices in a computer network, wherein the logs are stored in the storage, the methods as disclosed herein.

BRIEF DESCRIPTION OF THE DRAWINGS

The invention is herein described, by way of example only, with reference to the accompanying drawings, wherein:

FIG. 1 of the prior art illustrates three log samples;

FIG. 3 illustrates a highlighted log sample, highlighted at least in part in one or more sections by the user, according to an embodiment of the present invention;

FIG. 5 is a flow diagram of a method, according to an embodiment of the present invention;

FIG. 6 illustrates a screen shot according to an embodiment of the present invention;

FIG. 7 is an illustrative example of showing seven unique log patterns resulting from perform embodiments of the present invention.

DESCRIPTION OF THE PREFERRED EMBODIMENTS

Figure 1A:
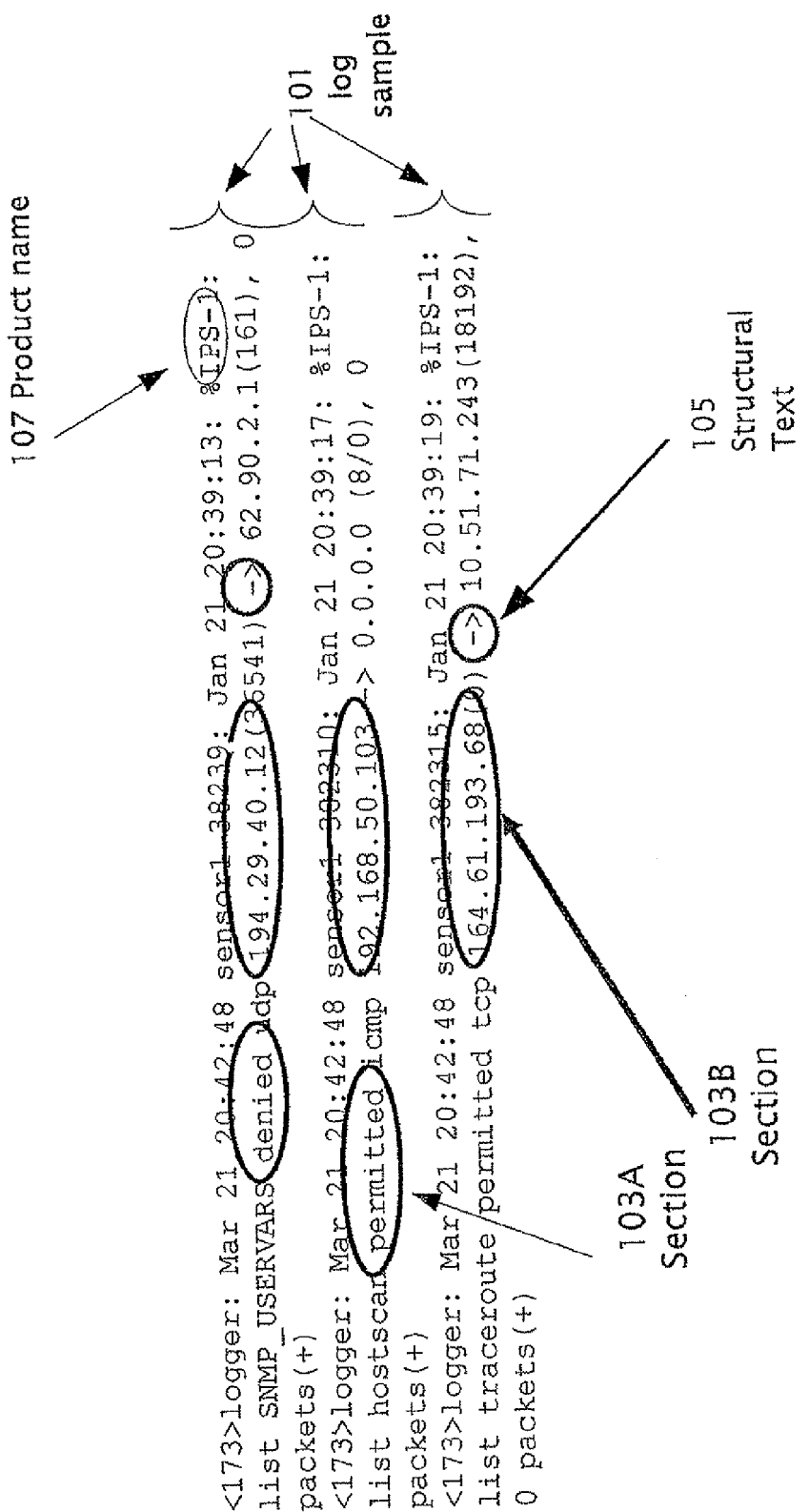
FIG. 1A illustrates according to an embodiment of the present invention and distinguishes between sections and structural text or symbol sin log samples of FIG. 1.

The present invention is of a system and method of determining parsing rules for a large number of logs by sampling a set of log samples, sectioning the log samples into sections and by matching the sections to regular expressions, reducing the set of log samples to a small set of unique patterns.

The principles and operation of a system and method of determining parsing rules for logs by inputting a large number, e.g. 200 log samples, and reducing the log samples into a much smaller set, e.g. 20, of unique patterns which represent all the original the log samples, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Figure 8:
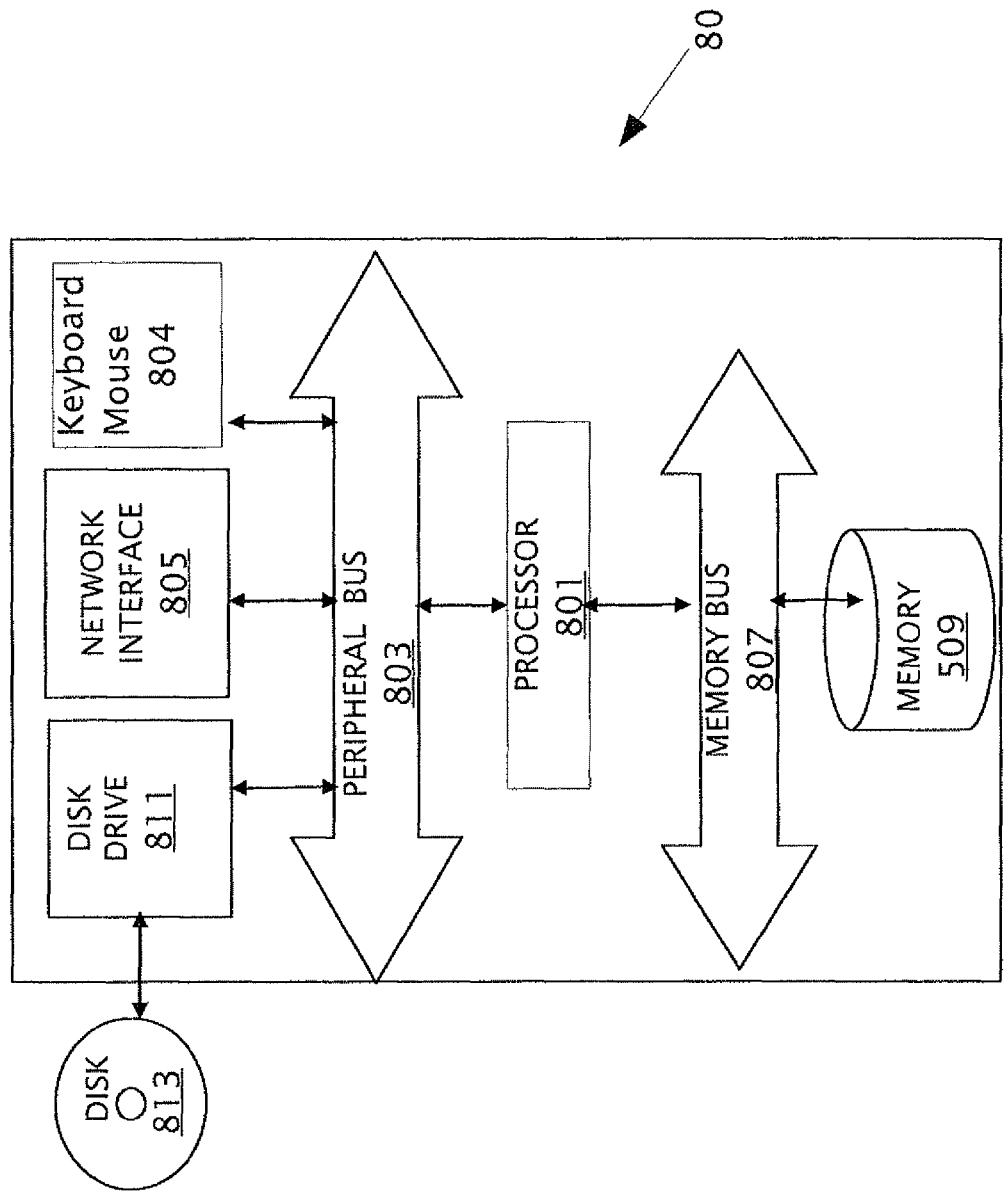
FIG. 8 illustrates a simplified computer system of the prior art.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data. An exemplary computer system 80 is simply illustrated in FIG. 8. Computer system 80 includes a processor 801 attached to memory 509 through a memory bus 807. Processor 801 is further connected to a disk drive 811 and an external computer network through a network interface 805. Disk drive 811 is equipped to read computer readable media 813 such as an optical and/or magnetic disk. A user interacts with computer system 80 using an input mechanism 804, e.g. keyboard or mouse and a display (not shown).

Those skilled in the art will appreciate that the invention may be practiced in network computing environments with many types of computer system configurations, including mobile telephones, PDA's, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

By way of introduction, an intention of the present invention is to simplify the process of creating rule sets for logs particularly of third party products in which parsing rules for the logs are not known a priori. The user does not necessarily have prior knowledge or definition of parsing files and in some embodiments may even avoid altogether knowing regular expressions.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Referring now to the drawings, FIG. 1A illustrates according to an embodiment of the present invention and distinguishes between sections 103 and structural text or symbols 105 in log samples 101 of FIG. 1. In the example shown, an arrow symbol 105 is shown as an example of a structural symbol 105 which separates source information from destination information. The term "section", as used herein is a variable portion 103. Examples of variable portions 103 include e.g. source IP address 103B 164.61.93.68, of a log, section 103 associated with and matching a regular expression, e.g. [0-9]+\.[0-9]+\.[0-9]+\.[0-9]+ or variable names 103A, e.g. "permitted" which matches a regular expression (permitted|denied)

Figure 2:
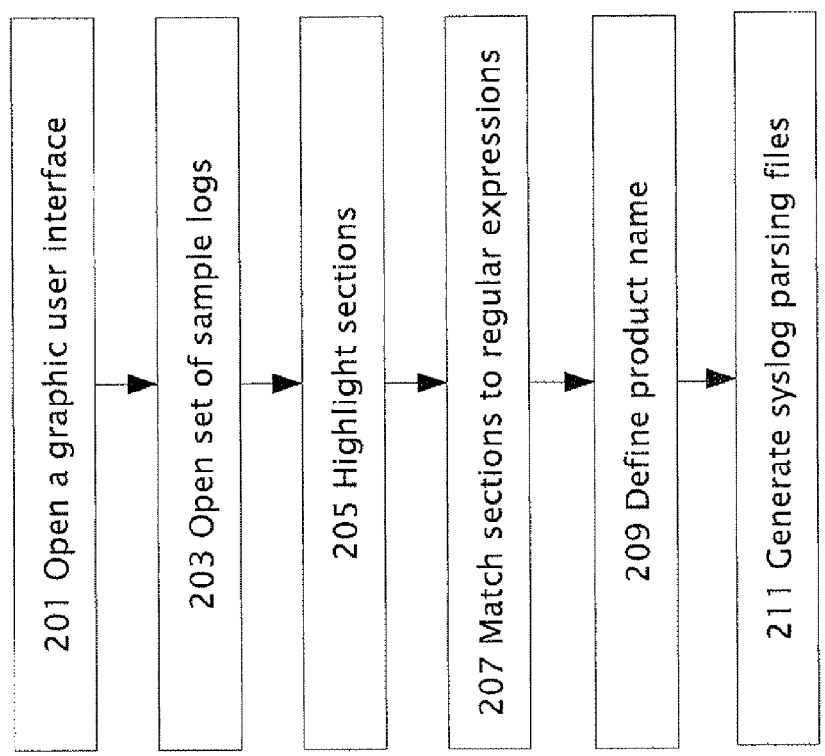
FIG. 2 is a simplified flow diagram of a method, according to an embodiment of the present invention.
Figure 4:
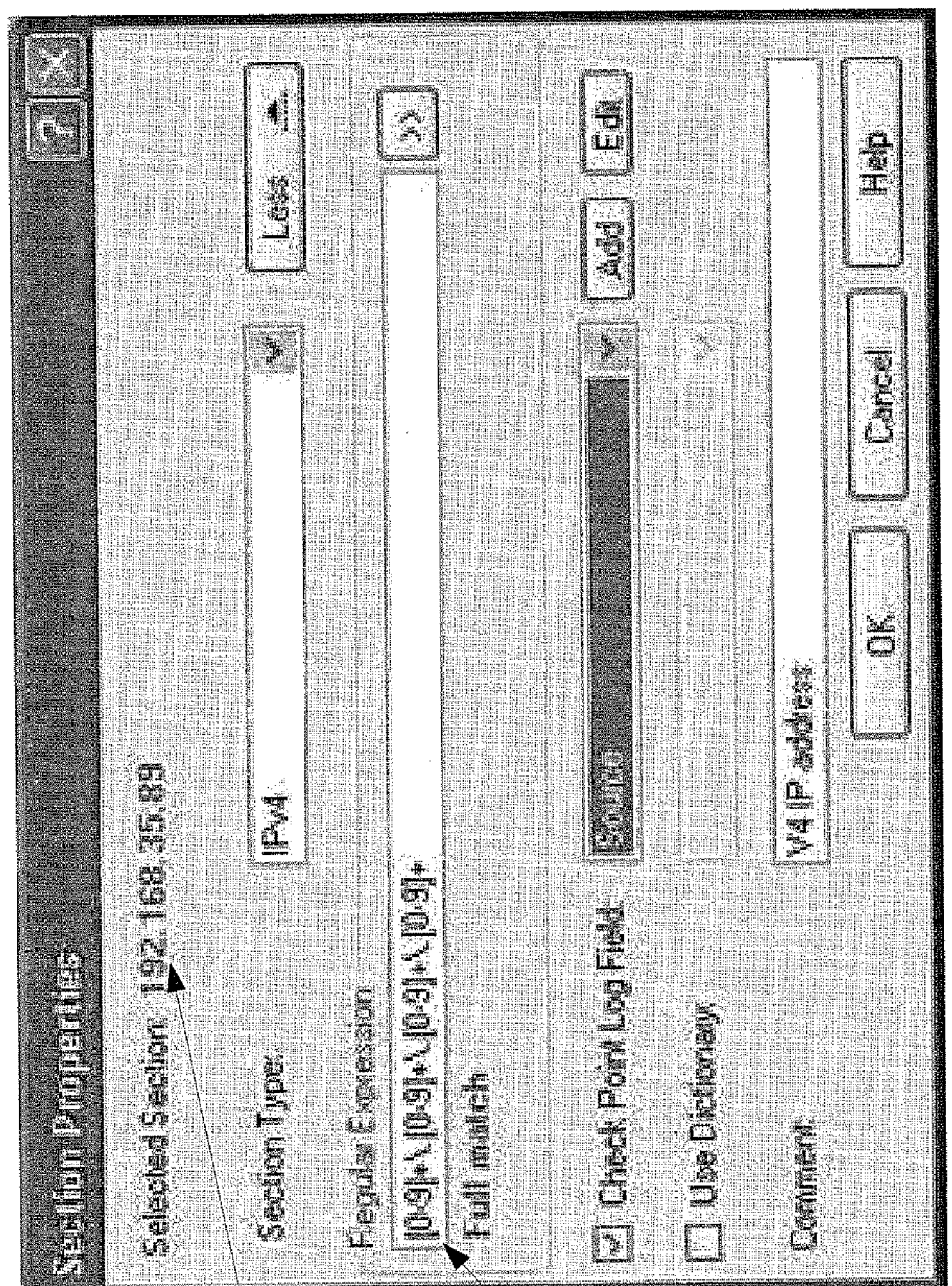
FIG. 4 illustrates a single window of the GUI, according to an embodiment of the present invention.

Reference is now made to FIG. 2 which illustrates a simplified flow diagram of a method 20, according to an embodiment of the present invention. In method 20, a user opens (step 201) a graphic user interface (GUI) which is used to interact with an application running on computer system 80. in which parsing files are generated, according to an embodiment of the present invention. The application opens (step 203) a set of log samples 101. Typically, the set opened (step 203) includes several hundred log samples 101. The user typically selects one of log samples 101 and highlights (step 205) a section 103 in log sample 101. Reference is now made to FIG. 3 which illustrates a highlighted log sample 101H, highlighted (step 205) at least in part in one or more sections 103 by the user. In highlighted log sample 101H, a highlighted source Internet Protocol (IP) field 103H is shown. Reference is now made to FIG. 4 which illustrates a single window 40 of the GUI. Highlighted section 103H is illustrated. The computer application typically compares highlighted section 103H to a stored library of regular expressions until a full match of the regular expression is found. A matched regular expression 401 fully matched to highlighted section 103H is shown. Referring back to FIG. 2, for each log sample 101, the user preferably adds (step 209) a product name to one of the fields of log sample 101, or identifies (step 209) a field corresponding to a product name already present in log sample 101, the product name referring to the network device which generated log sample 101. In FIG. 1A, product name 107 IPS-1 refers to an Intrusion Protection System of Check Point Software Technologies Inc. When all sections 103 of log sample 101 are matched to corresponding regular expressions, the combination of the matched regular expressions 401 together with structural text or symbols 105 are used to generate (step 211) parsing files for parsing all logs logged by the network devices.

Reference is now made to FIG. 5, a method 50, according to an embodiment of the present invention. In step 501, m log samples 101 are sampled (step 501) from N logs. m is typically much less than N. Typically, m is on the order of a hundred and N is several thousand or more. The m log samples 101 are input (step 203) by the application. The m log samples are sectioned (step 503) into sections and the sections are compared (step 507) with regular expressions from a list or library of regular expressions stored in memory 509. If a section 103 of log sample 101 matches (decision block 207) a regular expression then section 103 is tagged (step 521) with a tag associating section 103 to the matching regular expression. Otherwise, if a section 103 of log sample 101 does not match a regular expression section 103 is left untagged. The tags associated with the sections and with the static structural symbols 105 of log sample 101 form a log pattern. which may or may not be fully processed, some sections may not have been tagged (step 521) with tags associating them with regular expressions. If the log pattern from step 511 is unique, then the log pattern is stored (step 517) such as by storing log sample 101 and the sequence of tags associating the sections of log sample 101 to regular expressions. Otherwise, if a log pattern is previously stored (step 517) the method proceeds to the next log sample 101.

Figure 5A:
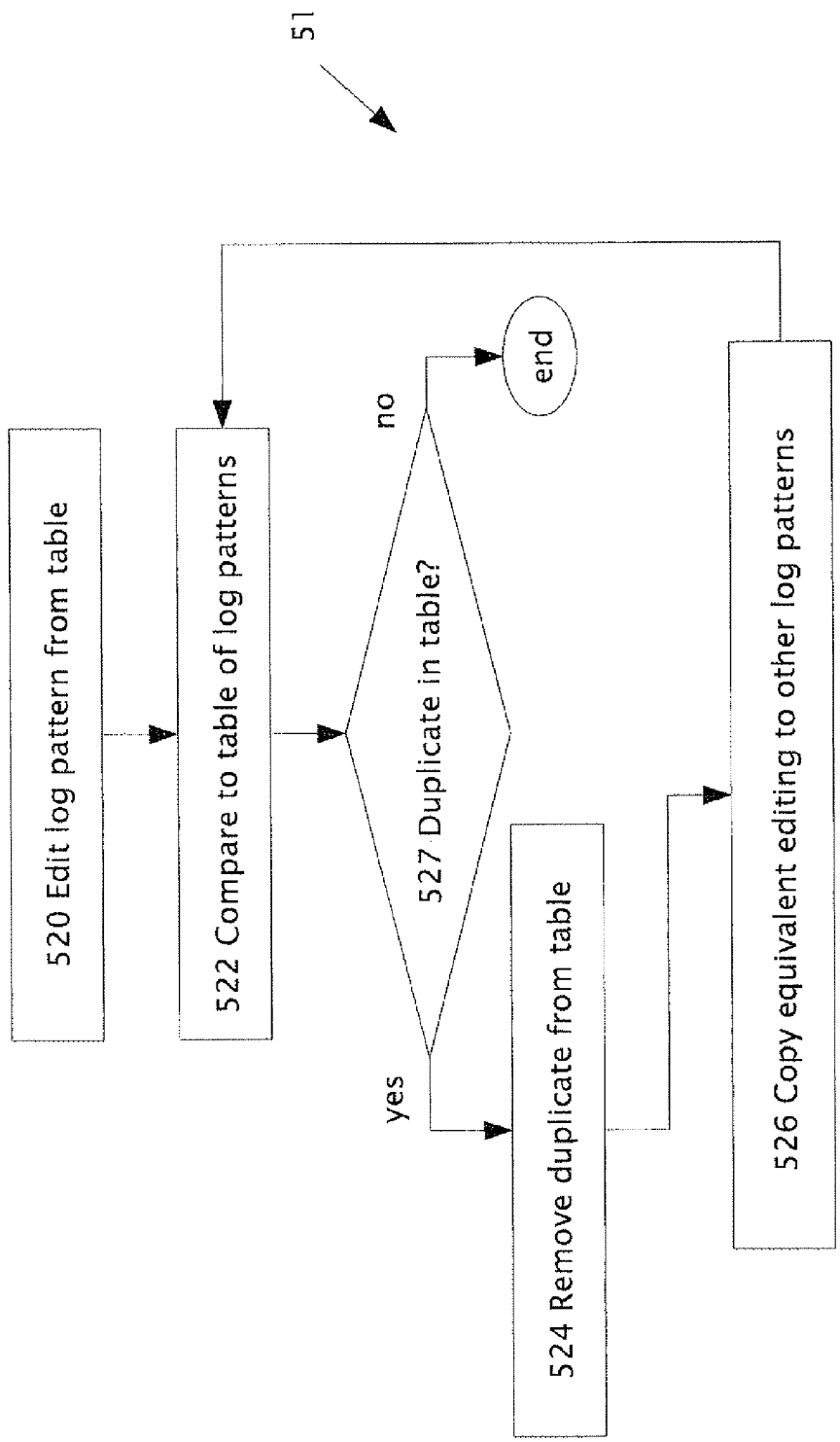
FIG. 5A is a flow diagram of a method, according to an embodiment of the present invention.

Reference is now made to FIG. 5A, illustrating a method 51 according to an embodiment of the present invention. The user selects one of the log patterns for editing (step 520) and the user edits a section 103 of the log pattern. As an example, log sample 101 as output from IPS-1 includes a date field in the format Jan 21 and another product IPS-X outputs logs with the exact same format but with a date field in the format 21-Jan. The user selects section 103 of one of the logs output from IPS-X with the date field and edits 21-Jan to be Jan 21. The log pattern from the log sample output from IPS-X is now after editing identical with the log pattern of log samples output from IPS-1. Referring back to FIG. 5A, in step 522 edited log pattern is compared with the list of log patterns and in decision box 527, duplicate log patterns are found. In step 524, the duplicate log patterns are removed from the table of log patterns. In step 526, editing is copied identically to other log patterns (originating from log samples of product IPS-X) and more duplicates are removed (step 524) from the table. When all duplicates have been removed from the table, process 51 ends.

Figure 6:
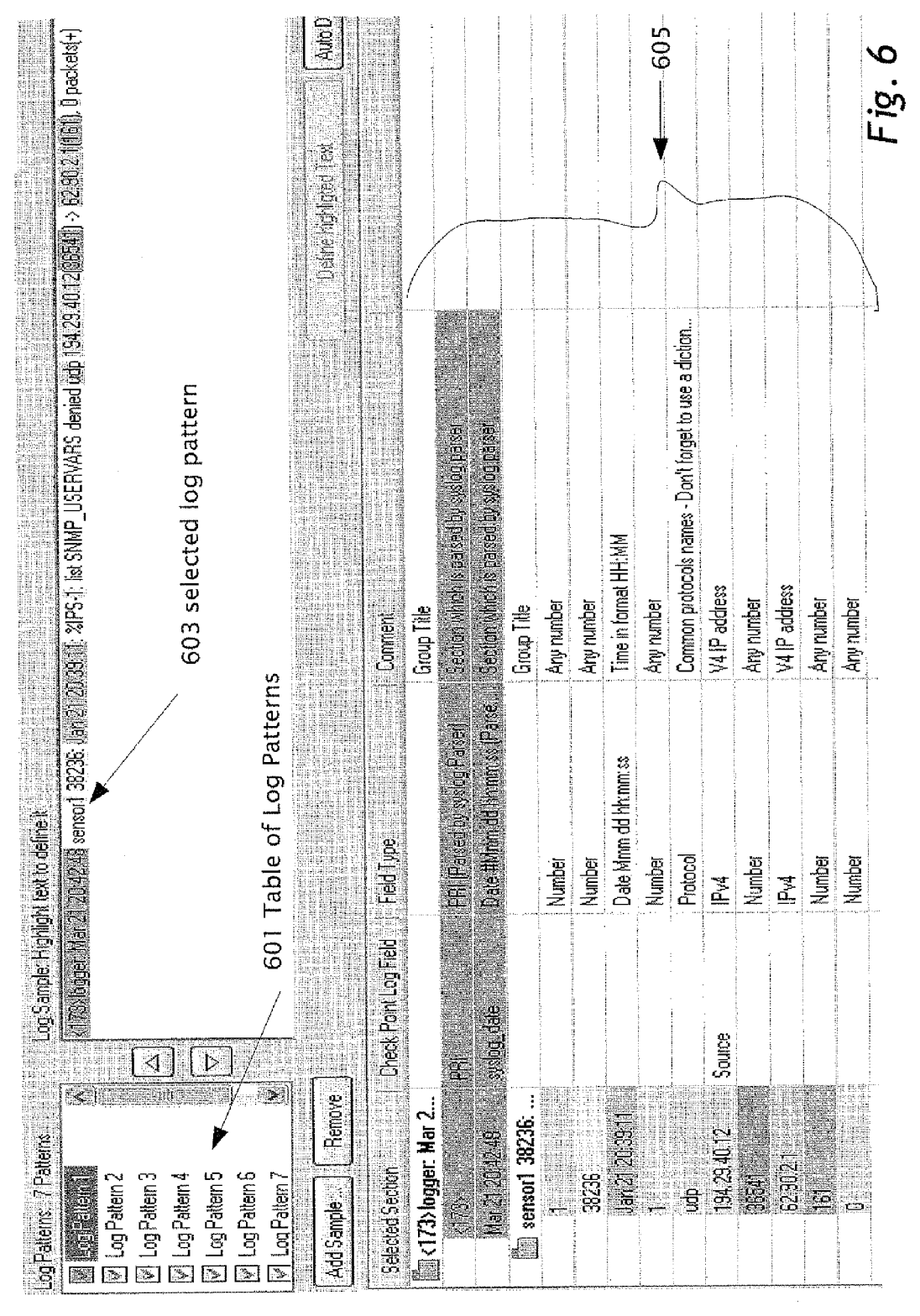
Figure 7:
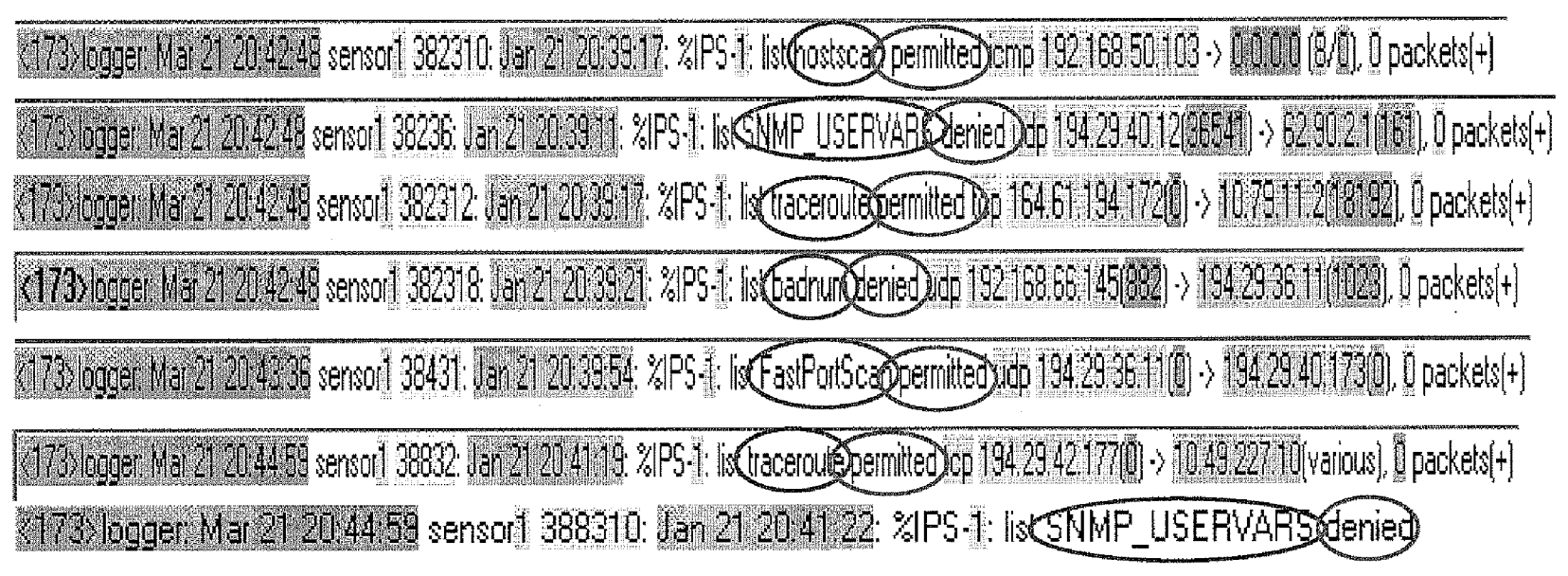

Reference is now made to FIG. 6 which illustrates a screen shot according to an embodiment of the present invention. Table of log patterns 601 is shown and one of the log patterns, e.g. log pattern 1 603 is selected. Highlighted sections 103 matched to regular expressions are shown in a second table 605. Unmatched expressions are not highlighted. Using the methods as disclosed herein, an input file including 166 log samples was reduced to seven unique log patterns illustrated in FIG. 7.

Some of the remaining non highlighted text is constant, e.g sensor while other text varies (circled) containing useful variable information. The remaining variable information, e.g. alert types, are optionally handled manually to further reduce the number of patterns.

Some fields like action or protocol may have different names in the syslogs than is normally expected in the logs. For instance, Check Point log contains the values permitted and denied instead of the standard values accept and reject. A dictionary maps these syslog values into expected values.

While the invention has been described with respect to a limited number of embodiments, it will be appreciated that many variations, modifications and other applications of the invention may be made.

What is claimed is:

1. A computerized method performed in a computer operatively connected to storage, the method for creating rule sets of logs output as text from a plurality of devices in a computer network, the method comprising the steps of:
    (a) sampling from said logs, a plurality of log samples from which the parsing rules are determined; and,
    (b) creating parsing rules from said log samples comprising:
        (1) obtaining a plurality of said log samples;
        (2) sectioning said log samples into a plurality of sections including variable information separated by static structural text;
        (3) processing each said log sample, subsequent to said sectioning thereof, by matching the plurality of sections to regular expressions comprising:
            (i) comparing said sections to a list of regular expressions, wherein said list is maintained in said storage, and
            (ii) upon matching a matched section of said sections to a matched regular expression from said list of said regular expressions,
            (iii) tagging said matched section with a tag associated with said matched regular expression and thereby,
            (iv) storing a tag associated to said matched regular expression; and,
            (v) combining any unmatched sections with said static structural text and with said tags thereby creating a log pattern;
        (4) determining whether said log pattern is distinct from all log patterns previously stored in said table, and storing said distinct log pattern in a table;
        (5) presenting a portion of at least one of said log patterns of said table to said user;
        (6) receiving input from said user to produce at least one edited log pattern; and,
        (7) determining whether said at least one edited log pattern is identical with at least one of the other log patterns previously stored in said table and upon finding another identical log pattern, removing from said table either said at least one edited log pattern or said previously stored other log pattern.

2. A computerized method performed in a computer operatively connected to storage, the method for creating rule sets of logs output as text from a plurality of devices in a computer network, the method comprising the steps of:

(a) sampling from said logs, a plurality of log samples from which the parsing rules are determined; and,
(b) creating parsing rules from said log samples comprising:
  (1) obtaining said log samples and sectioning selected said log samples;
  (2) matching the sectioned log samples to regular expressions including: comparing each of said log samples to a list of regular expressions, wherein said list is maintained in said storage, and upon matching each said log sample to at least one matched regular expression from said list, associating said at least one matched regular expression to said log sample thereby creating a log pattern;
  (3) subsequent to said comparing, storing said log pattern in a table only if said log pattern is distinct from all log patterns previously stored in said table;
  (4) presenting a portion of at least one of said log patterns of said table to said user;
  (5) receiving input from said user to produce at least one edited log pattern; and,
  (6) determining whether said at least one edited log pattern is identical with at least one of the other log patterns in said table, and upon finding another identical log pattern, removing from said table, either said at least one edited log pattern or said previously stored other log pattern.

3. The method, according to claim 1, further comprising the steps of:
  (8) providing a user interface to a user of the computer; and,
  wherein said presenting a portion of at least one of said log patterns of said table to said user is presented on a display operatively connected to the computer.

4. A physical storage medium readable by a machine, tangibly embodying a program of instructions executable by the machine to perform a method for creating rule sets of logs output as text from a plurality of devices in a computer network, the method comprising the steps of claim 1.

5. The method, according to claim 1, wherein said plurality of log samples is only a portion of the plurality of logs.

6. The method according to claim 1, wherein said sectioning said log samples into a plurality of sections is performed without reference to regular expressions.

7. The method, according to claim 2, further comprising the steps of:
  (7) providing a user interface to a user of the computer; and,
  wherein said presenting a portion of at least one of said log patterns of said table to said user is performed on a display operatively connected to the computer.

8. A physical storage medium readable by a machine, tangibly embodying a program of instructions executable by the machine to perform a method for creating rule sets of logs output as text from a plurality of devices in a computer network, the method comprising the steps of claim 2.

9. The method, according to claim 2, wherein said plurality of log samples is only a portion of the plurality of logs.

* * * * *